Oct. 15, 1940.  G. A. AMSBURY  2,218,064
RIDING TRAILER
Filed May 19, 1939

INVENTOR.
George A. Amsbury
BY
ATTORNEY.

Patented Oct. 15, 1940

2,218,064

UNITED STATES PATENT OFFICE 2,218,064

RIDING TRAILER

George A. Amsbury, Spokane, Wash.

Application May 19, 1939, Serial No. 274,636

6 Claims. (Cl. 280—87.1)

This invention relates to riding trailers for lawn mowers and similar machines and it is one object of the invention to provide a trailer which may be hitched to the rear of a lawn mower or the like and upon which the operator of the lawn mower may ride. It will thus be seen that the operator of the lawn mower will be relieved of the fatigue incident to walking behind the lawn mower.

Another object of the invention is to provide the trailer with a supporting wheel and with improved foot controlled means for controlling the supporting wheel and guiding movements of the moving machine. It will accordingly be seen that the operator may control movements of the machine by means of his feet without leaving the trailer and will have his hands free to grasp the handles of the mowing machine and aid in balancing the machine.

Another object of the invention is to so construct the trailer that it may be easily applied to a power driven mower of conventional construction and, in addition, to provide a trailer which is of durable but light construction and capable of being easily handled and applied to or removed from a mower.

The invention is illustrated in the accompanying drawing wherein.

Figure 1:
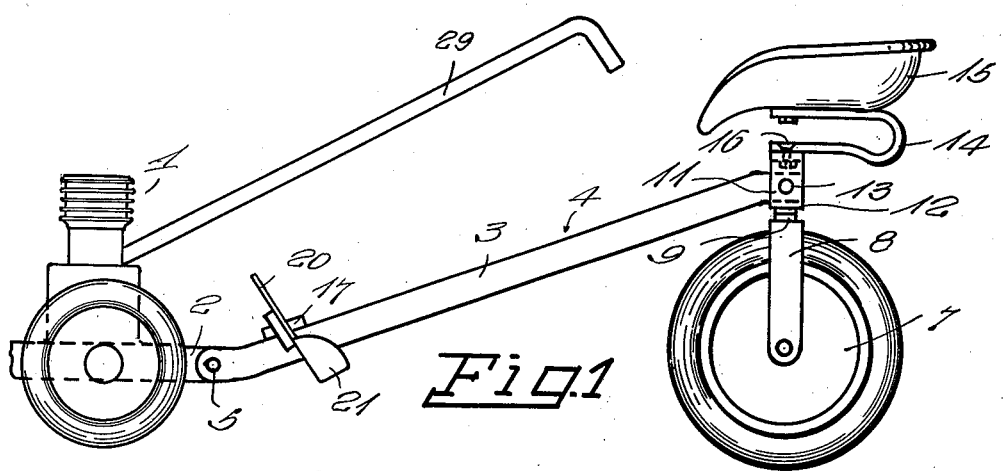
Fig. 1 is a side elevation of the improved trailer, showing it attached to the rear portion of a power driven mowing machine.

This improved trailer is intended to be attached to the rear portion of a power driven mowing machine or the like, of conventional construction, and in the present illustration the mowing machine 1 has been shown provided with side rails 2 to which side bars 3 of the trailer frame 4 are connected by bolts 5, to pivotally mount the trailer at its forward end so that it may have vertical tilting movement relative to the mower and thus accommodate itself to uneven ground during use of the mowing machine. A bracing bar 6 extends between forward end portions of the side bars 3 to brace the side bars and maintain them in proper spaced relation to each other.

The rear end of the frame is supported by a wheel 7 rotatably mounted in a yoke 8 which is formed at its top with a bearing cup 9 through which passes a pin 10 for pivotally connecting the yoke with a rectangular mounting 11 having a bearing cup 12 to receive the pin. By so mounting the yoke it may turn about the vertically disposed pin and movement of the mower be guided. Rear ends of the side bars 3 are secured to side portions of the mounting by bolts 13. The bearing cups 9 and 12 constitute elements of a thrust ball bearing and, due to the presence of this thrust bearing, the yoke may turn very easily. The spring 14 of the seat 15 is secured to the top of the mounting 11 by a bolt 16. Since the seat is mounted over the supporting wheel, the weight of the operator of the mowing machine will be well supported and balanced and the trailer will not have a tendency to turn over.

Figure 2:
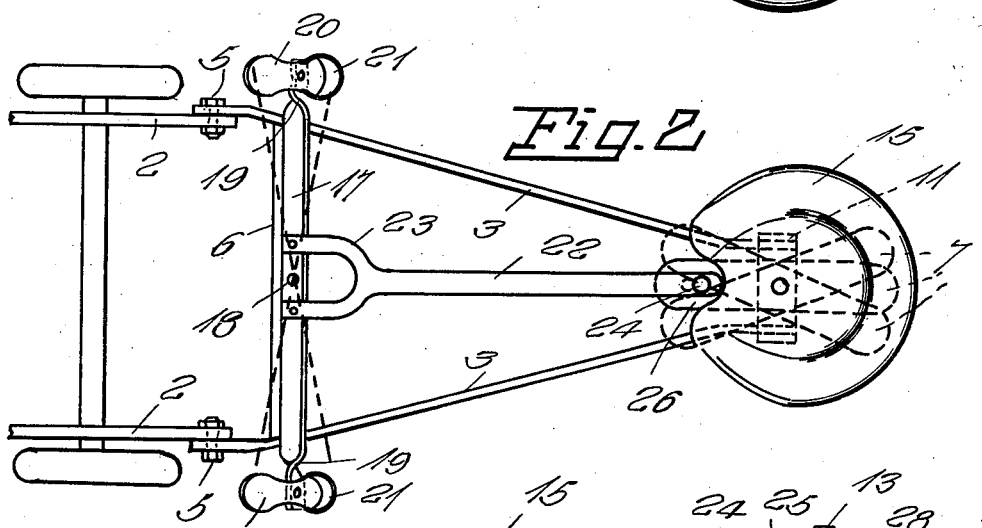
Fig. 2 is a top plan view thereof.
Figure 3:
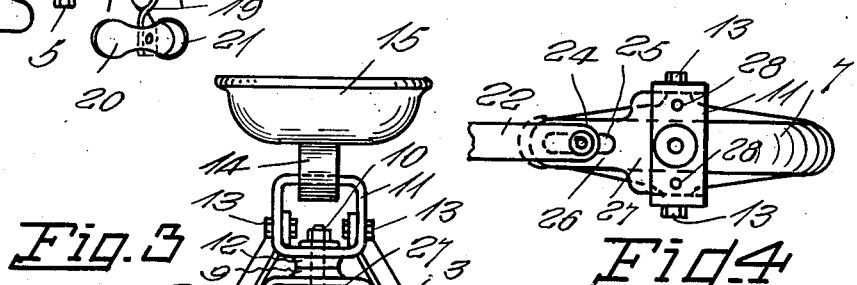
Fig. 3 is a rear elevation of the trailer.
Figure 4:
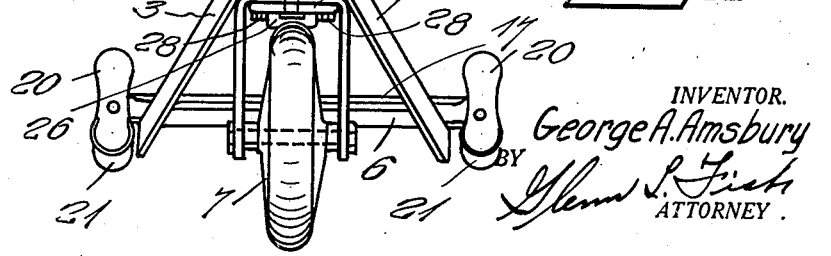
Fig. 4 is a top plan view of the supporting wheel and its mounting.

In order to keep the mower in a straight path and direct its movement when making turns, there has been provided steering mechanism including a steering bar 17 extending transversely across the forward portion of the frame 4 and pivoted midway its length to the cross bar 6 by a bolt or other suitable fastening 18. Ends of the steering bar are twisted, as shown at 19, and these twisted ends of the steering bar carry stirrups or foot rests 20 having heel portions 21 so that a person's feet may rest easily upon the foot rests and not be liable to slip out of engagement therewith. A link or tongue 22 extending longitudinally of the frame has a forked front end 23, the arms of which are riveted to the steering bar in spaced relation to opposite sides of the pivot 18, and the rear end of the tongue is provided with a depending pin 24 engaged in a slot 25 formed in the front end portion 26 of a bracket plate 27 secured under the bridge of the fork 8 by bolts 28. When the operator of the mower applies equal pressure to the foot rests of the device, the steering bar will be maintained parallel to the cross bar 6 and the supporting wheel will be held in its normal position for directing the mower straight ahead. By applying pressure to force one end of the steering bar forwardly, as indicated by dotted lines in Fig. 2, the link or tongue 22 will be swung transversely of the frame 4 and since the pin or bolt 24 is slidably engaged in the slot 25, the front end of the bracket plate will be swung transversely of the frame and the yoke turned about its pivot pin 10, as indicated by dotted lines, and cause the wheel 7 to steer the tractor toward the right or left, according to the direction in which the steering bar and the yoke are moved. Steering of the mower may be accomplished while occupying the seat 15 and, since the steering is effected by the feet, the operator may grasp the handles 29 and easily maintain his balance on the seat. By removing the bolts 5, the trailer may be detached from the mower for storage or transfer to another machine, to which it may be easily and quickly applied.

Having thus described the invention, what is claimed is:

1. A trailer of the character described comprising a frame having side bars formed at their front ends with openings to receive fasteners for pivotally connecting the same with a machine to be controlled, an open rectangular mounting member disposed vertically and having rear ends of the side bars secured to its opposite side portions, a yoke disposed vertically under said mounting, a wheel rotatably mounted in said yoke, a pin pivotally connecting said yoke with the lower portion of said mounting, a steering bar extending transversely across said frame and pivoted midway its length, and a lever arm extending rearwardly from said steering bar radially of its pivot and connected with said yoke for turning the yoke about its pivot when the steering bar is rocked about its pivot.

2. A trailer of the character described comprising a substantially triangular frame having rearwardly converging side bars, means for connecting front ends of said side bars with a machine to be controlled, a cross bar between forward end portions of said side bars, a steering bar extending transversely of the frame and pivoted midway its length to said cross bar, a mounting secured vertically between rear ends of said side bars, a yoke pivotally mounted under said mounting, a wheel rotatably mounted in said yoke, a seat mounted upon said mounting over said yoke, and a lever arm extending rearwardly from said steering bar and having loose pivotal connection with said yoke for turning the yoke about its pivot when the steering bar is rocked about its pivot.

3. A trailer of the character described comprising a frame having side bars, a bracing bar extending between said side bars, a steering bar pivoted midway its length to said bracing bar, a mounting carried by rear ends of said side bars, a yoke pivotally mounted under said mounting, a wheel rotatably carried by said yoke, a bracket carried by said yoke and having a portion projecting forwardly therefrom and formed with a longitudinally extending slot, a tongue extending longitudinally of said frame between the side bars and having forks at its front end secured to said steering bar at opposite sides of the pivot for the steering bar, and a pin carried by the rear end of said tongue and engaged in the slot of said bracket for shifting the bracket transversely and turning the yoke about its pivot when the steering bar is rocked about its pivot.

4. A trailer of the character described comprising a frame having side bars, a bracing bar extending between said side bars, a steering bar pivoted midway its length to said bracing bar, a mounting disposed vertically, rear ends of said side bars being secured to opposite sides of said mounting, a yoke, a wheel rotatably carried by said yoke, the yoke being disposed under said mounting, a pin pivotally connecting the yoke with the mounting, a bearing about said pin for said yoke, a bracket plate carried by said fork and having a portion projecting forwardly therefrom and formed with a longitudinally extending slot, a tongue extending longitudinally of said frame with its front end firmly secured to said steering bar, said tongue having swinging movement transversely of the frame when the steering bar is rocked, and a pin carried by the rear end of said tongue and engaged in the slot of said bracket for turning the yoke when the steering bar is rocked.

5. A trailer of the character described comprising a frame having side bars, a bracing bar extending between said side bars, a steering bar pivoted midway its length to said bracing bar, an open rectangular mounting disposed vertically, rear ends of said side bars being secured against inner faces of side portions of said mounting, a yoke having a bridge and side arms, a wheel rotatably mounted between the side arms of said yoke, a bracket plate secured against the under face of the bridge of the yoke and projecting forwardly therefrom, a pin passing through the bearing plate and the bridge of the yoke and the lower portion of said mounting for pivotally connecting said yoke with said mounting, companion bearing elements carried by the lower portion of said mounting and the bridge of said yoke and constituting a thrust bearing for the yoke surrounding said pin, a tongue extending longitudinally of said frame between the side bars and having its front end secured to said steering bar and its rear end overlapping the forward portion of said bracket plate, and a pin carried by the rear end of said tongue and engaged through the longitudinally extending slot in the bracket plate for swinging the bracket plate transversely and turning the yoke about its pivot when the steering bar is rocked about its pivot.

6. A trailer of the character described comprising a frame, a rear wheel for said frame, a yoke rotatably mounting said wheel and pivotally mounted under the frame, a seat carried by said frame, a steering bar extending transversely of said frame and pivoted midway its length, a bracket carried by said yoke and projecting forwardly therefrom and formed with a longitudinally extending slot, a tongue carried by said steering bar and extending rearwardly therefrom, and a pin carried by the rear end of said tongue and engaged through said slot for turning the yoke about its pivot when the steering bar is rocked about its pivot.

GEORGE A. AMSBURY.